United States Patent
Lee

(10) Patent No.: US 9,316,854 B2
(45) Date of Patent: Apr. 19, 2016

(54) DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Sang Jig Lee, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 48 days.

(21) Appl. No.: 14/108,448

(22) Filed: Dec. 17, 2013

(65) Prior Publication Data

US 2014/0176851 A1 Jun. 26, 2014

(30) Foreign Application Priority Data

Dec. 21, 2012 (CN) ...................... 2012 2 0717760 U

(51) Int. Cl.
*G02F 1/1333* (2006.01)
*G02F 1/1335* (2006.01)
*F21V 8/00* (2006.01)

(52) U.S. Cl.
CPC ........ *G02F 1/133308* (2013.01); *G02B 6/0085* (2013.01); *G02F 1/133608* (2013.01); *G02B 6/0091* (2013.01); *G02F 1/133385* (2013.01); *G02F 1/133615* (2013.01); *G02F 2001/133314* (2013.01); *G02F 2001/133317* (2013.01); *G02F 2001/133628* (2013.01)

(58) Field of Classification Search
CPC .................... G02F 1/133308; G02F 1/133608
USPC ............................................................ 349/58
See application file for complete search history.

(56) References Cited

U.S. PATENT DOCUMENTS

2014/0063404 A1* 3/2014 Chen et al. ...................... 349/58

\* cited by examiner

*Primary Examiner* — Phu Vu
(74) *Attorney, Agent, or Firm* — Nath, Goldberg & Meyer; Jerald L. Meyer; Leonid D. Thenor

(57) ABSTRACT

The embodiments of this utility model provide a display device, comprising a display panel, a module frame supporting the display panel, and a light guide plate and a heat conducting plate each arranged on the back of the display panel, wherein a supporting plate supporting the module frame is arranged on the heat conducting plate. According to the display device of this utility model, the supporting plate is arranged on the heat conducting plate so as to stably support the bottom of the module frame, thereby to enhance the structural strength, to ensure the display panel to be supported stably and flatly, and to prevent the display panel from being warped or deformed due to the internal or external pressure. Meanwhile, the side strength of the display device is enhanced remarkably, so the display device of this utility model is not easy to be damaged in the case of side impact.

12 Claims, 4 Drawing Sheets

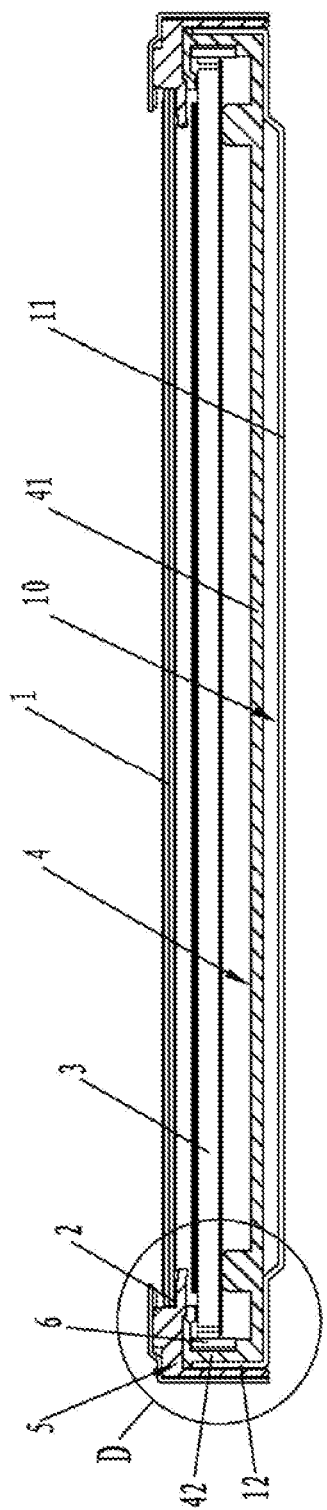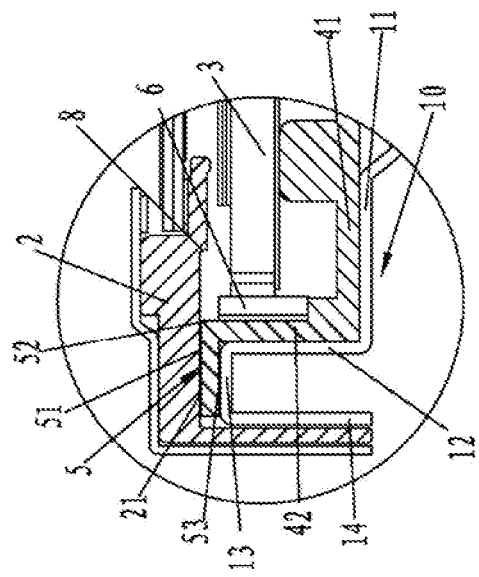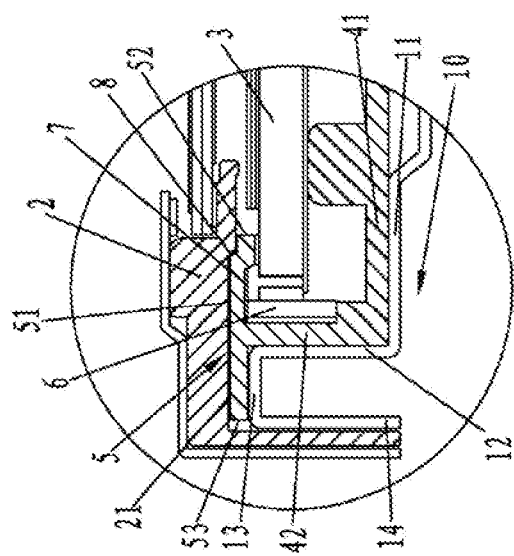
Fig. 5
Fig. 7
Fig. 6

DISPLAY DEVICE

CROSS-REFERENCE TO RELEVANT APPLICATION

The present application claims a priority of the Chinese patent application No.201220717760.0 filed on Dec. 21, 2012, which is incorporated herein by reference in its entirety.

TECHNICAL FIELD

The embodiments of this utility model elate to an indicating device for displaying variable information by a static method, in particular to a display device.

BACKGROUND

Along with continuous innovations of display technology; display device is being on a path to make it thinner, to make the border narrower and to provide a larger format. FIG. 1 shows the structure of an existing display device, which comprises a liquid crystal panel 1', a module frame 2' supporting the liquid crystal panel 1', and a light guide plate 3' and a heat conducting plate 4' each arranged on the back of the liquid crystal panel 1'. The heat conducting plate 4' functions as to secure a light source and transfer the heat produced by the light source to the outside. When the structure of such a display device is applied to a large-scale display device, the heat conducting plate, in a U shape, cannot support the module frame effectively, so the module frame will easily be deformed due to the pressure from the liquid crystal panel. Meanwhile, a side of the display device is of insufficient strength to be easily damaged in the case of side impact.

SUMMARY

An object of this utility model is to provide a display device of which side strength is enhanced and which can support a module frame effectively.

The display device of this utility model comprises a display panel, a module frame supporting the display panel, and a light guide plate and a heat conducting plate each arranged on the back side of the display panel, wherein a supporting plate supporting the module frame is arranged on the heat conducting plate.

A supporting plane of the supporting plate, which supports the module frame, is parallel to a contacting plane of the module frame, which is in contact with the supporting plane of the supporting plate.

The supporting plate is parallel to the display panel.

The heat conducting plate includes a base plate parallel to the display panel, and a side wall plate vertically connected to an edge of the base plate. The supporting plate is connected to a top end of the side wall plate.

An inner end of the supporting plate is connected to the top end of the side wall plate, and the supporting plate extends from the top end of the side wall plate to a direction away from a center of the liquid crystal panel.

An outer end of the supporting plate is connected to the top end of the side wall plate, and the supporting plate extends from the top end of the side wail plate to a direction towards the center of the liquid crystal panel.

A back plate is arranged on the back side of the heat conducting plate.

The back plate comprises a bottom back plate parallel to the base plate. A first side plate is vertically directly connected to the bottom back plate and inserted into a space between the side wall plate and the module frame. A portion of the module frame is attached to an outer surface of the first side plate.

A back plate is arranged on the back side of the heat conducting plate and includes a bottom back plate parallel to the base plate of the heat conducting plate, a first side plate vertically connected to an end of the bottom back plate is arranged at the outer side of the side wall plate and attached thereto, the top end of the first side plate is connected to a flat plate parallel to the bottom back plate, a tip end of the flat plate is vertically connected to a second side plate which is parallel to the first side plate, the first side plate, the fiat plate and the second side plate are connected in turn to form a groove which opens downwards and is formed into an inverted-U shape, and a portion of the module frame is attached to an outer surface of the second side plate.

A middle part of the supporting plate is connected to the top end of the side wail plate. The inner end of the supporting plate extends from the top end of the side wall plate to a direction towards the center of the display panel, and the outer end of the supporting plate extends from the top end of the side wall plate to a direction away from the center of the display panel.

The flat plate supports the supporting plate.

A light source facing a side of the light guide plate is mounted on the side wall plate.

A reflection layer is arranged on a plane of the supporting plate facing the light source.

A groove matching with the supporting plate is arranged on a plane of the module frame facing the supporting plate. A bottom wall of the groove is the contacting plane in contact with the supporting plane of the supporting plate.

According to the display device of this utility model, the supporting plate is arranged on the heat conducting plate so as to stably support the bottom of the module frame, thereby to enhance the structural strength, to ensure the display panel to be supported stably and flatly, and to prevent the display panel from being warped or deformed due to the internal or external pressure. Meanwhile, the side strength of the display device is enhanced remarkably, so the display device of this utility model is not easy to be damaged in the case of side impact.

BRIEF DESCRIPTION OF THE DRAWINGS

FIG. 5 is a schematic view showing the structure of the display device according to the fourth embodiment of this utility model;

FIG. 6 is an enlarged view of the detail A in FIG. 2;

FIG. 7 is an enlarged view of the detail B in FIG. 3;

DETAILED DESCRIPTION

Figure 1:
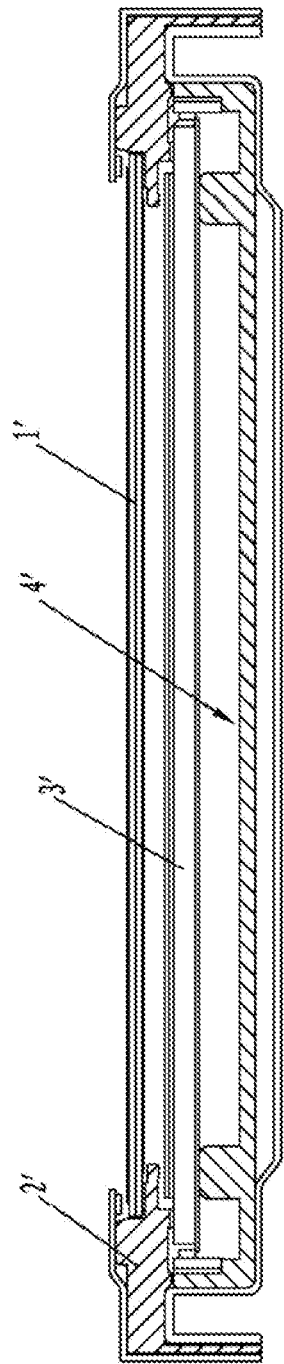
FIG. 1 is a schematic view showing the structure of an existing display device.
Figure 2:
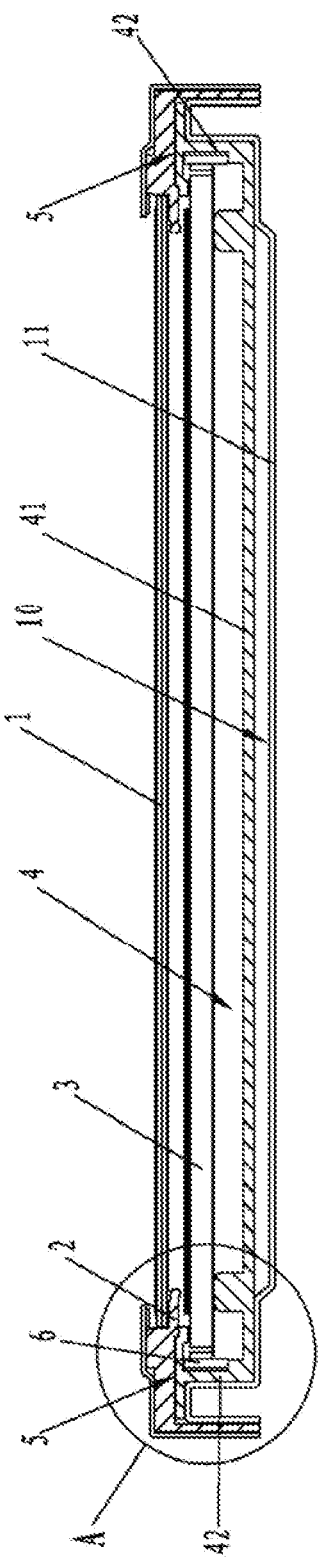
FIG. 2 is a schematic view showing the structure of the display device according to the first embodiment of this utility model.

As shown in FIG. 2, a display device of this utility model comprises a display panel 1, a module frame 2 supporting the display panel 1, and a light guide plate 3 and a heat conducting plate 4 each arranged on the back of the display panel 1. A supporting plate 5 supporting the module frame 2 is arranged on the heat conducting plate 4, and a back plate 10 for reinforcing the structural strength is arranged on the back side of the heat conducting plate 4. The display panel is a liquid crystal panel, and also may be OLED panel, plasma panel and so on. According to the display device of this utility model, the supporting plate is arranged on the heat conducting plate so as to stably support the bottom of the module frame, thereby to reinforce the structural strength, to ensure the liquid crystal panel to be supported stably and flatly, and to prevent the liquid crystal panel from being distorted due to deformation of the back plate. The display device of this utility model is especially suitable for a large-scale liquid crystal display.

Following are the embodiments of the display device of this utility model.

First Embodiment

As shown in FIG. 6, a supporting plane 51 of the supporting plate which supports the module frame 2 is parallel to a contacting plane 21 of the module frame 2 which is in contact with the supporting plane 51 of the supporting plate 5.

The supporting plate 5 is parallel to the liquid crystal panel 1.

The heat conducting plate 4 includes a base plate 41 parallel to the liquid crystal panel 1, and a side wall plate 42 vertically connected to an edge of the base plate 41. The side wall plate 42 and the base plate 41 form a chamber receiving the light guide plate 3. The supporting plate 5 is connected to a top end of the side wall plate 42, and a light source 6 facing a side of the light guide plate 3 is mounted on the side wall plate 42.

A middle part of the supporting plate 5 is connected to the top end of the side wall plate 42.

The supporting plate 5 includes an inner end 52 extending from the top end of the side wall plate 42 to a direction towards a center of the liquid crystal panel 1, and an outer end 53 extending from the top end of the side wall plate 42 to a direction away from the center of the liquid crystal panel 1. The base plate 41, the side wall plate 42 and the supporting plate 5 in the embodiment are integrated. Of course, the base plate 41, the side wall plate 42 and the supporting plate 5 may be formed in other ways.

Second Embodiment

Figure 3:
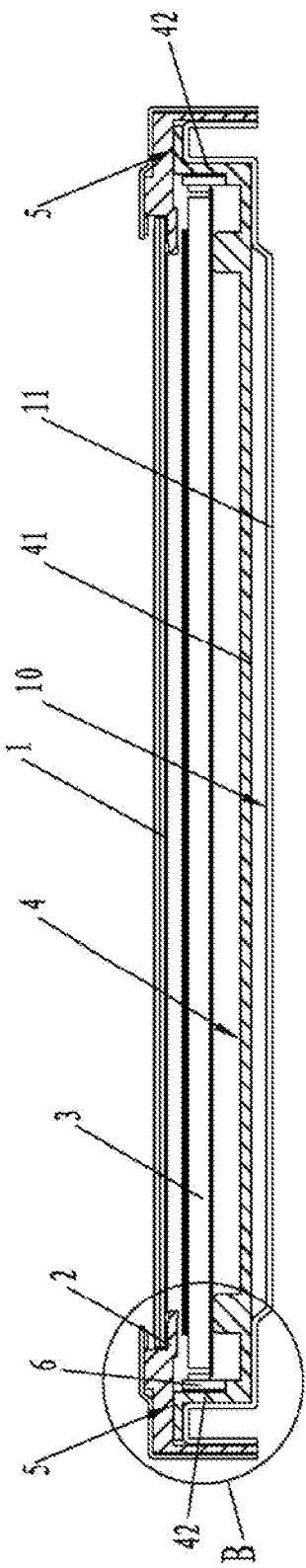
FIG. 3 is a schematic view showing the structure of the display device according to the second embodiment of this utility model.

As shown in FIGS. 3 and 7, merely the arrangement of the supporting plate 5 is different from that in the first embodiment. The inner end 52 of the supporting plate 5 is directly connected to the top end of the side wall plate 42, and the supporting plate 5 extends from the top end of the side wall plate 42 to a direction away from the center of the liquid crystal panel 1.

Third Embodiment

Figure 4:
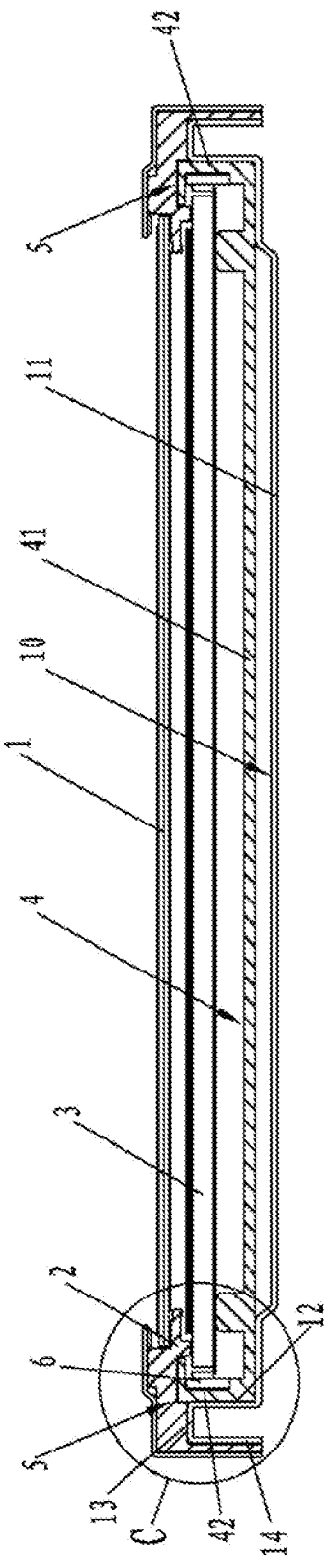
FIG. 4 is a schematic view showing the structure of the display device according to the third embodiment of this utility model.
Figure 8:
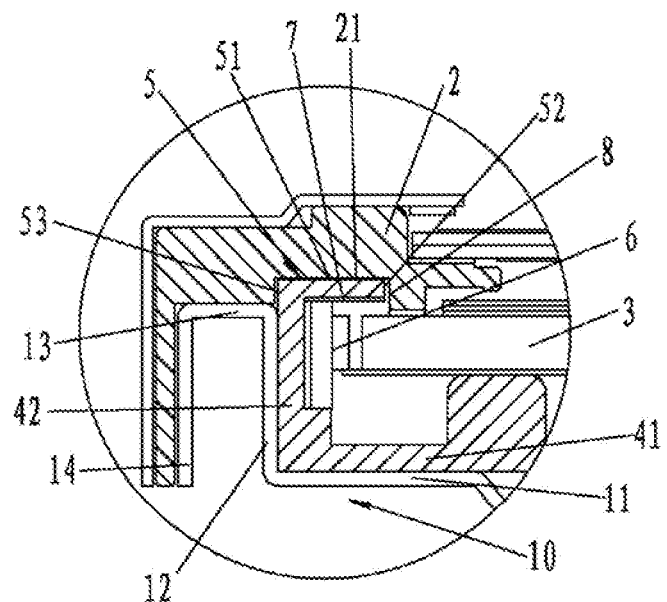
FIG. 8 is an enlarged view of the detail C in FIG. 4.

As shown in FIGS. 4 and 8, the arrangement of the supporting plate 5 is different from those in the first and second embodiments.

The outer end 53 of the supporting plate 5 is directly connected to the top end of the side wall plate 42, and the supporting plate 5 extends from the top end of the side wall plate 42 to a direction towards the center of the liquid crystal panel 1.

In the above-mentioned three embodiments, the back plate 10 for reinforcing the structural strength is arranged on the back of the heat conducting plate 4 and includes a bottom back plate 11 parallel to the base plate 41 of the heat conducting plate 4. A first side plate 12 vertically directly connected to an end of the bottom back plate 11 is arranged at the outer side of the side wall plate 42 and attached thereto. The top end of the first side plate 12 is connected to a flat plate 13 parallel to the bottom back plate 11. In the first and second embodiments, the flat plate 13 can support the supporting plate 5 to some extents. A tip end of the flat plate 13 is vertically connected to a second side plate 14 which is parallel to the first side plate 12. The first side plate 12, the flat plate 13 and the second side plate 14 are connected in turn to form a groove which opens downwards and is formed into an inverted-U shape, and a portion of the module frame 2 is attached to an outer surface of the second side plate 14 Such a structure helps to reinforce the structural strength of the entire display device.

Fourth Embodiment

Figure 9:
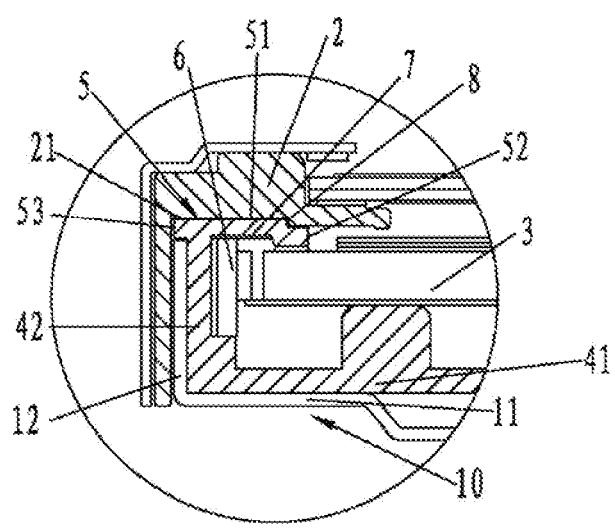
FIG. 9 is an enlarged view of the detail D in FIG. 5.

As shown in FIGS. 5 and 9, as further improvement to the third embodiment, the back plate 10 of the display device is free of the above-mentioned groove. The back plate 10 includes the bottom back plate 11 parallel to the base plate 41 of the heat conducting plate 4, and the first side plate 12 is directly, vertically connected to an end of the bottom back plate 11. The first side plate 12 is inserted into a space between the side wall plate 42 and the module frame 2, and a portion of the module frame 2 is attached to the outer surface of the first side plate 12.

Due to the existence of the supporting plate, the side strength of the display device is reinforced remarkably. Hence, the groove in the third embodiment may be removed, so that the display device of this utility model is more suitable for a display with a narrow border.

In the first, third and fourth embodiments, a reflection layer 7 for reflecting light is arranged on a plane of the supporting plate 5 facing the light source 6. For example, the reflection layer 7 is a mirror reflecting layer. The mirror reflecting layer may be acquired by mirror finishing the surface of the supporting plate 5, and it is used to reflect the light from the light source 6 to the light guide plate 3, so as to prevent light leakage. As a result, it is able to further improve the light efficiency and reduce the number of LED lamps in the light source 6, thereby to reduce the cost. Also, dark portions between the light source 6 and the side wall plate 42 may be reduced, and light spots on the liquid crystal panel 1 may be prevented.

In the above-mentioned four embodiments, a groove 8 matching with the supporting plate 5 is arranged on a plane of the module frame 2 facing the supporting plate 5. The supporting plate 5 is inserted into the groove 8, and the bottom wall of the groove 8 is the contacting plane 21 in contact with the supporting plane 51 of the supporting plate 5.

The display device of this utility model is especially suitable for a large-scale liquid crystal display. Along with an increase in the size, the back plate of the liquid crystal display will be easily deformed and distorted. According to the display device of this utility model, the supporting plate is arranged on the heat conducting plate so as to stably support the bottom of the module frame, thereby to enhance the structural strength, to ensure the liquid crystal panel to be supported stably and flatly, and to prevent the liquid crystal panel from being warped or deformed due to the internal or external pressure. Meanwhile, the side strength of the display device is enhanced remarkably; so the display device of this utility model is not easy to be damaged in the case of side impact.

The above are merely the preferred embodiments of this utility model. It should be noted that, a person skilled in the art may make improvements and modifications without departing from the principle of this utility model, and these improvements and modifications shall also be considered as the scope of this utility model.

What is claimed is:

1. A display device, comprising a display panel, a module frame supporting the display panel, and a light guide plate and a heat conducting plate each arranged on the back side of the display panel, wherein a supporting plate supporting the module frame is arranged on the heat conducting plate;

the heat conducting plate includes a base plate parallel to the display panel and a side wall plate vertically connected to an edge of the base plate, and the supporting plate is connected to a top end of the side wall plate; and a back plate is arranged on the back side of the heat conducting plate and includes a bottom back plate parallel to the base plate of the heat conducting plate, a first side plate directly vertically connected to an end of the bottom back plate is arranged at the outer side of the side wall plate and attached thereto, the top end of the first side plate is connected to a flat plate parallel to the bottom back plate, a tip end of the flat plate is vertically connected to a second side plate which is parallel to the first side plate, the first side plate, the flat plate and the second side plate are connected in turn to form a groove which opens downwards and is formed into an inverted-U shape, and a portion of the module frame is attached to an outer surface of the second side plate.

2. The display device according to claim 1, wherein a supporting plane of the supporting plate which supports the module frame is parallel to a contacting plane of the module frame, the contacting plane is in contact with the supporting plane of the supporting plate.

3. The display device according to claim 1, wherein the supporting plate is parallel to the display panel.

4. The display device according to claim 1, wherein an inner end of the supporting plate is directly connected to the top end of the side wall plate, and the supporting plate extends from the top end of the side wall plate to a direction away from a center of the display panel.

5. The display device according to claim 1, wherein an outer end of the supporting plate is directly connected to the top end of the side wall plate, and the supporting plate extends from the top end of the side wall plate to a direction towards the center of the display panel.

6. A display device, comprising a display panel, a module frame supporting the display panel, and a light guide plate and a heat conducting plate each arranged on the back side of the display panel, wherein a supporting plate supporting the module frame is arranged on the heat conducting plate, the heat conducting plate includes a base plate parallel to the display panel and a side wall plate vertically connected to an edge of the base plate, and the supporting plate is connected to a top end of the side wall plate, a back plate is arranged on the back side of the heat conducting plate, and wherein the back plate includes a bottom base plate parallel to the base plate, a first side plate is vertically directly connected to an end of the bottom back plate and inserted into a space between the side wall plate and the module frame, and a portion of the module frame is attached to an outer surface of the first side plate.

7. The display device according to claim 1, wherein a middle part of the supporting plate is connected to the top end of the side wall plate, an inner end of the supporting plate extends from the top end of the side wall plate to a direction towards the center of the display panel, and the outer end of the supporting plate extends from the top end of the side wall plate to a direction away from the center of the display panel.

8. The display device according to claim 7, wherein the flat plate supports the supporting plate.

9. The display device according to claim 4, wherein the flat plate supports the supporting plate.

10. The display device according to claim 1, wherein a light source facing a side of the light guide plate is mounted on the side wall plate.

11. The display device according to claim 10, wherein a reflecting layer is arranged on a plane of the supporting plate facing the light source.

12. The display device according to claim 2, wherein a groove matching with the supporting plate is arranged on a plane of the module frame facing the supporting plate, and a bottom wall of the groove is the contacting plane in contact with the supporting plane of the supporting plate.

* * * * *